United States Patent [19]

Larson

[11] Patent Number: 4,830,910

[45] Date of Patent: May 16, 1989

[54] LOW ADHESION COMPOSITIONS OF PERFLUOROPOLYETHERS

[75] Inventor: James M. Larson, St. Paul, Minn.

[73] Assignee: Minnesota Mining and Manufacturing Company, St. Paul, Minn.

[21] Appl. No.: 122,287

[22] Filed: Nov. 18, 1987

[51] Int. Cl.[4] .......................... C09J 7/02; B32B 9/04; B32B 27/32

[52] U.S. Cl. .................. 428/336; 427/385.5; 427/387; 428/343; 428/352; 428/422; 428/447

[58] Field of Search ..................... 428/40, 65, 64, 336, 428/213, 332, 422, 421, 343, 352, 447; 528/44, 183; 560/125, 115; 526/246; 260/544 F; 540/596; 427/385.5, 387

[56] References Cited

U.S. PATENT DOCUMENTS

| | | | |
|---|---|---|---|
| 3,250,807 | 5/1966 | Fritz et al. | 260/544 F |
| 3,536,749 | 10/1970 | Groves | 560/125 |
| 3,544,537 | 12/1970 | Brace et al. | 526/246 |
| 3,553,179 | 1/1971 | Bartlett | 260/80.72 |
| 3,810,874 | 5/1974 | Mitsch et al. | 528/44 |
| 3,864,318 | 2/1975 | Caporiccio et al. | 260/80.3 N |
| 4,080,319 | 3/1978 | Caporiccio et al. | 528/183 |
| 4,239,828 | 12/1980 | Knope et al. | 428/64 |
| 4,268,556 | 5/1981 | Pedrotty | 428/65 |
| 4,306,954 | 12/1981 | Wendling | 204/159.22 |
| 4,321,404 | 3/1982 | Williams et al. | 560/115 |
| 4,404,247 | 9/1983 | Dominguez-Burguette et al. | 428/213 |
| 4,472,480 | 9/1984 | Olson | 428/332 |
| 4,567,073 | 1/1986 | Larson et al. | 428/40 |
| 4,647,413 | 3/1987 | Savu | 540/596 |
| 4,681,925 | 7/1987 | Strepparola et al. | 428/421 X |

*Primary Examiner*—Thomas J. Herbert
*Attorney, Agent, or Firm*—D. M. Sell; W. N. Kirn; C. Truesdale

[57] ABSTRACT

A low adhesion perfluoropolyether composition is provided. The composition comprises a copolymer prepared from a mixture of at least one monofunctional perfluoropolyether monomer and at least one difunctional perfluoropolyether monomer, each of said monofunctional and difunctional monomers having a molecular weight in the range of about 1500 to 2500.

17 Claims, No Drawings

4,830,910

LOW ADHESION COMPOSITIONS OF PERFLUOROPOLYETHERS

FIELD OF THE INVENTION

This invention relates to articles, such as pressure-sensitive adhesive tapes, having a substrate with a coating layer, or liner, of a low adhesion composition of perfluoropolyethers and to a process for preparing such coated or lined articles.

Pressure-sensitive tapes are widely used articles of manufacture. One type of pressure-sensitive adhesive tape is that which is wound directly upon itself in roll form. Such tape has a substrate which has a pressure-sensitive adhesive on one face and generally has a low adhesion backsize, or release, coating on the other face to facilitate unwinding of the tape without delamination of the adhesive. Another type of pressure-sensitive adhesive tape is a composite-type tape as sold for use. This composite-type tape has a base, such as film, paper, or the like which has a pressure-sensitive adhesive on one face and a disposable protective web having a substrate with a low-adhesion release layer on one face, the low-adhesion release layer contacting and protecting the pressure-sensitive adhesive. Any such low-adhesion coating must both adhere strongly to its underlying substrate and be sufficiently cohesive so as to not contaminate the adhesive, i.e., not to interfere unduly with its adhesiveness.

Pressure-sensitive adhesive tapes having porous backings such as breathable medical tapes have a particular need for highly effective low adhesion backsize coatings when wound upon themselves into roll form. Unless the low-adhesion backsize coating is sufficiently effective, the pressure-sensitive adhesive may gradually migrate into the pores of the backing creating a mechanical bond such that the adhesive layer splits upon unwinding. For some such tapes, use of a nonporous, disposable, low-adhesion web is required where sufficiently effective low-adhesion backsize coatings are not available.

Certain pressure-sensitive adhesives such as poly(dimethylsiloxane) are extremely aggressively tacky. Pressure-sensitive adhesive tapes utilizing such adhesives also have a need for highly effective low-adhesion backsize coatings, especially after prolonged storage. Unless the low adhesion backsize coating is sufficiently effective, such adhesives can carry away such coating material, and thus be contaminated by appreciable amounts of the low-adhesion material.

Various substrates require low-adhesion backsize coatings for a variety of purposes, e.g., nonstick coatings for cookware, ice-releasing coatings for aircraft, and lubricative coatings for magnetic recording media. Such low-adhesion coatings are sometimes called "release coatings", a term which also encompasses release agents for molds, which may be effective only by failing cohesively. Lubricants usually function as release coatings by cohesive failure. To distinguish release coatings which are designed to fail cohesively from those which are designed to resist cohesive failure, the latter are sometimes called "liners" and more specifically, "low energy liners" because low energy is important to their effectiveness.

U.S. Pat. No. 3,536,749 (Groves) discloses fluorocarbon-acrylate products which are useful as low-adhesion backsize coatings for many pressure-sensitive adhesive tapes. These fluorocarbon-acrylate products are adducts of fluorocarbon amides having at least one hydrogen atom bonded to the amide nitrogen atom with an ester of acrylic acid and are in the form of monomeric solids when used as low-adhesion backsize coatings.

A perfluoropolyether low surface energy liner useful as a low-adhesion backsize coating for pressure-sensitive adhesive tape is disclosed in U.S. Pat. No. 4,472,480 (Olson). The liner comprises an insoluble polymer of polymerized, film-forming monomer having a polymerizable functionality greater than one, preferably within the range of 1.5 to 2.0 in order to provide covalent bonding at both ends of most of the segments, and a perfluoropolyether segment which is a plurality of perfluoroalkylene oxide repeating units. A composite low surface energy liner of perfluoropolyether is disclosed in U.S. Pat. No. 4,567,073 (Larson et al). This composite liner has an inner layer of insoluble polymer made from polymerizable film-forming monomer having a polymerization functionality greater than one and an outer layer of insoluble polymer made from a polymerizable film-forming monomer copolymerizable with the monomer of the inner layer and having a perfluoropolyether segment which is a plurality of polyalkylene oxide repeating units and which preferably has a functionality within the range of 1.5 to 2.0 in order to provide covalent bonding at both ends of most of the segments.

Perfluoropolyether polymers are known to function effectively for the lubrication of plastics and metallized magnetic recording media. For example, U.S. Pat. No. 4,404,247 (Dominguez/Burguette et al.) discloses magnetic recording medium protected by an ultra-thin, composite low surface energy covering provided by an inner layer of insoluble polymer and an outer layer of insoluble polymer which are made by in situ polymerization. The inner layer is made from two monomers, a film-forming aromatic or heterocyclic polymerizable monomer having a plurality of ethylenically unsaturated polymerizable groups and a vinyl aromatic comonomer, and the outer layer is made from polymerizable perfluoropolyether monomer having ethylenically unsaturated polymerizable groups.

U.S. Pat. No. 4,268,556 (Pedrotty) discloses rigid magnetic recording disks lubricated with a thin coating of a fluorinated telechelic polyether polymer having a backbone of —$C_aF_{2a}O$— units, where a is an integer of 1 to 4, terminated by at least one polar group, such that $\mu^2/MW$ of the polymer is at least $19 \times 10^{-4}$ Debye$^2$-moles/g. Useful polar groups include —$CONHCH_2CH_2OH$, —$COOCH_3$, —$CONHCH_2C_6H_5$, and —$COCF_3$.

U.S. Pat. No. 4,239,828 (Knope et al.) discloses a flexible magnetic recording disk contained in an envelope having a wiping fabric impregnated with a highly fluorinated alkyl polyether having a viscosity index of 10-130 such that the polyether transfers to the disk as it rotates within the envelope to lubricate the interface between the rotating disk and a magnetic recording head.

Although the perfluoropolyether lubricants are generally better than alternative lubricants with regard to improved lubricity and reduced coefficients of friction on both plastics and metals, e.g. metallized recording media, greater lubricity and reduction in the coefficients of friction is desired.

U.S. Pat. No. 3,250,807 (Fritz et al.) discloses dicarboxylic acids of fluorocarbon ethers and fluorides, esters, amides and salts thereof. The fluorocarbon ethers have perfluoropolyether backbone segments and are obtained by the reaction of diacid difluorides with hexafluoropropylene epoxide.

U.S. Pat. No 3,810,874 (Mitsch et al.) discloses polyfunctional poly(perfluoroalkylene oxides), their preparation and their use in the preparation of polymers such as polyurethanes, polysiloxanes, polyesters, polycyanurates, polytriazines, polyamides, polyimides, and others.

U.S. Pat. No. 4,080,319 (Caporiccio et al.) discloses elastomeric copolyimides which have biscycloimide units linked to perfluoropolyether blocks and which are prepared by reacting fluorinated polyether diamines with tetracarboxylic acids in the form of anhydrides or esters of the acids.

U.S. Pat. No. 4,321,404 (Williams et al.) discloses radiation curable compositions for abherent coatings which comprise a polyfluorinated acrylate compound, a polyethylenically unsaturated crosslinking agent and a film-forming organic polymer. Among the preferred polyfluorinated acrylate compounds are poly(fluorooxyalkylene)urethane acrylates and methacrylates which contain perfluoropolyether segments in the backbone.

U.S. Pat. No. 4,647,413 (Savu) discloses perfluoropolyether oligomers and polymers which can be prepared by the condensation or addition reaction of a perfluoroaliphatic diacyl fluoride with hexafluoropropylene epoxide to produce an acid fluoride-terminated adduct or oligomer product which is then subjected to ultraviolet light-induced cleavage/coupling reaction or photopolymerization to yield an acid fluoride-terminated coupled or block polymer. This photopolymer product can be further reacted to yield derivatives.

Perhaps even more pertinent is U.S. Pat. No. 4,681,925 (Strepparola et al.) which discloses fluorinated polymers prepared from acrylic esters and/or acrylamides, in which the cross-linking degree of the final product is controlled by using, as a starting product, a mixture of mono- and di-acryl monomers, the monomers being characterized in that they include in their structure a perfluoropolyoxyalkylene chain. These polymers are described as being elastomeric and very flexible at low temperatures and possessing excellent resistance to thermal degradation, excellent oil- and water-repellent properties, high resistance to the action of mineral oils and vegetable oils, high resistance to oxidizing agents and excellent surface physical properties which result in extremely low values of the critical surface tension and of the wettability of films prepared therefrom, and are particularly suitable for imparting a high resistance to soiling and to water absorption to fabrics.

Monofunctional perfluoropolyether monomers, such as those disclosed in U.S. Pat. Nos. 3,810,874, 4,080,319 and 4,321,404 provide polymers which are generally less effective in many applications as low adhesion coatings and liners than difunctional perfluoropolyether monomers. The difunctional perfluorpolyether monomers, such as those described in U.S. Pat. Nos. 3,250,807, 3,810,874, 4,321,404, 4,472,480, 4,567,073 and 4,647,413 provide polymers having good low energy properties for low adhesion coatings and liners, but are often difficult and expensive to prepare.

There has been a long-felt need for a low adhesion coating having the excellent release properties generally provided by the difunctional perfluoropolyether monomers and the cost effectiveness of the monofunctional perfluoropolyether monomers.

The present invention provides a substrate having a release coating thereon, the coating comprising a copolymer prepared from a mixture of at least 10 weight percent of at least one monofunctional perfluoropolyether monomer having a number average molecular weight of about 1500 to 2500, which monomer comprises a plurality of perfluoroalkylene oxide, $-C_aF_{2a}O-$, repeating units, where subscript a in each unit is independently an integer from 1 to 4 and at least one difunctional perfluoropolyether monomer having a number average molecular weight of about 1500 to 2500, which monomer comprises a plurality of perfluoroalkylene oxide, $-C_aF_{2a}O-$, repeating units, where subscript a in each unit is independently an integer from 1 to 4. The monofunctional perfluoropolyether monomer and the difunctional perfluoropolyether monomer are present in amounts such that the coating provides a release peel value less than that provided by a polymer coating of the monofunctional perfluoropolyether monomer and substantially similar to or less than that of a polymer coating of the difunctional perfluoropolyether monomer at the same thickness. The term "substantially similar to" as used in regard to the release peel values of the coating prepared from the mixture of monomers and the coating prepared from the difunctional monomers is intended to include those coatings prepared from mixtures which provide release peel values up to about 35% greater than that provided by coatings prepared from the difunctional monomer. Preferably, the release peel values of the coating prepared from the mixture of monomers is at least equal to that prepared from the difunctional monomer.

Preferably, the monofunctional perfluoropolyether monomer comprises about 10 to 75 weight percent, more preferably 25 to 75 weight percent, and the difunctional perfluoropolyether monomer comprises about 25 to 90 weight percent, more preferably 25 to 75 weight percent, of the mixture. Preferably the thickness of the coating is in the range of about 5 to 500 nm, more preferably in the range of 10 to 100 nm.

The term "difunctional" as used herein includes monomers having a functionality of 1.5 to 2.0 or greater. The cured copolymers provide improved properties as components of coatings, layers and liners.

Surprisingly, it has been found that less expensive copolymers prepared from mixtures of the monofunctional perfluoropolyether monomer and the difunctional perfluoropolyether perform at least as well as polymers prepared from the difunctional perfluoropolyether and, in many cases, perform better than polymers prepared from the difunctional perfluoropolyether monomer when evaluated for release properties.

The present invention further provides a pressure-sensitive adhesive tape comprising a flexible web having a pressure-sensitive adhesive layer adherently bonded to at least one side thereof, and a liner comprising a 10 weight copolymer prepared from a mixture of at least percent of at least one monofunctional perfluoroether monomer having a number average molecular weight in the range of about 1500 to 2500, which monomer comprises a plurality of perfluoroalkylene oxide, $-C_aF_{2a}O-$ repeating units where subscript a in each unit is independently integer from 1 to 4, and at least one difunctional perfluoropolyether monomer having a number average molecular weight in the range of about 1500 to 2500, which monomer comprises a plurality of perfluoroalkylene oxide, —$C_aF_{2a}O$— repeating units where subscript a in each unit is independently an integer from 1 to 4, the monofunctional perfluoropolyether monomer and the difunctional perfluoropolyether monomer being present in amounts such that the liner provides a release peel value less than that provided by a polymer coating of the monofunctional perfluoropolyether monomer and substantially similar to or less than that of a polymer coating of the difunctional perfluoropolyether monomer at the same thickness.

Preferably, the monofunctional perfluoropolyether monomer comprises about 10 to 75 weight percent, more preferably 25 to 75 weight percent, and the difunctional perfluoropolyether monomer comprises about 25 to 90 weight percent, more preferably 25 to 75 weight percent, of the mixture. Preferably the thickness of the coating is in the range of about 5 to 500 nm, more preferably in the range of 10 to 100 nm.

The present invention also provides a method making a substrate with a liner, comprising the steps of (a) providing a dilute solution of polymerizable monomers comprising a mixture of at least 10 weight percent of at least one monofunctional perfluoropolyether monomer having a number average molecular weight in the range of about 1500 to 2500, which monomer comprises a plurality of perfluoroalkylene oxide, —$C_aF_{2a}O$— repeating units where subscript a in each unit is independently an integer from 1 to 4, and at least one difunctional perfluoropolyether monomer which monomer comprises a plurality of perfluoroalkylene oxide, —$C_aF_{2a}O$— repeating units where subscript a in each unit is independently an integer from 1 to 4, (b) coating said solution onto the substrate, (c) drying the coating, and (d) in-situ polymerizing the monomers to provide an insoluble, cohesive polymer network which is adhered to the substrate, the monofunctional perfluoropolyether monomer and the difunctional perfluoropolyether monomer being present in amounts such that the coating provides a release peel value less than that provided by a polymer coating of the monofunctional perfluoropolyether monomer and substantially similar to or less than that of a polymer coating of the difunctional perfluoropolyether monomer at the same thickness.

Preferably, the monofunctional perfluoropolyether monomer comprises about 10 to 75 weight percent, more preferably 25 to 75 weight percent, and the difunctional perfluoropolyether monomer comprises about 25 to 90 we.ight percent, more preferably 25 to 75 weight percent, of the mixture. Preferably the thickness of the coating is in the range of about 5 to 500 nm, more preferably in the range of 10 to 100 nm.

The new copolymers when provided coated on or layered with various substrates have greatly improved properties for release coating applications and are less expensive than coatings or layers prepared from only difunctional monomers due to the use of the less expensive monofunctional comonomer.

One class of monofunctional perfluoropolyether monomers which can be used for making the copolymers of the present invention are those represented by Formula I:

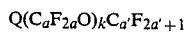   I wherein Q comprises a polymerizable, preferably addition polymerizable, group attached to a chain of randomly distributed perfluoroalkylene oxide, —$C_aF_{2a}O$—, repeating unit segments, in each of which a is independently an integer of 1 to 4, k is the number of such repeating units in the perfluoroalklylene oxide segments and has a value from 5 to 30 such that the segment preferably has a number average molecular weight in the range of about 1500 to 2500 and a' is an integer of 1 to 4. Typically the perfluoroalkylene oxide units will be —$CF_2O$—, —$C_2F_4O$— and/or —$C_3F_6O$—.

One subclass of perfluoropolyether monomers is that which includes the monofunctional ethylenically-unsaturated perfluoropolyether monomers wherein Q of the above Formula I is selected from

 (a)

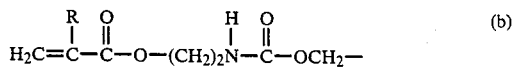 (b)

and the like wherein R is hydrogen or methyl, the preparation of which is disclosed in U.S. Pat. No. 4,321,404 (Williams et al.), which is incorporated herein by reference for that purpose. These monomers are prepared from perfluoropolyether acids through esters thereof by reduction to 1,1-dihydroalcohols and reaction with compounds which provide useful polymerizable groups such as those listed for Q above as a) and b).

Another subclass of monomers may be prepared by reduction of the amide group of perfluoropolyether acid amides and reaction of the resulting 1,1-dihydroperfluoropolyether amines the preparation of which is described in U.S. Pat. No. 4,080,319 (Caporiccio et al.) which is incorporated herein by reference for that purpose to provide Q groups such as

 (c)

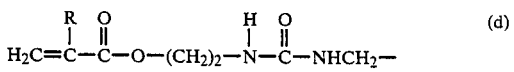 (d)

wherein R is hydrogen or methyl.

A further subclass of monomers is that which includes monofunctional monomers prepared as described by U.S. Pat. No. 3,810,874 (Mitsch et al.) which is incorporated herein by reference for that purpose, wherein Q of the above Formula I can be represented by $X_bYZ_c$, where X is a polyvalent, preferably divalent, linking organic radical such as —CONR—, —$CO_2$—, —COS—, —CO—,

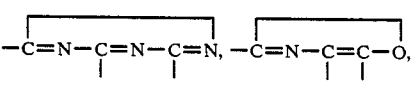

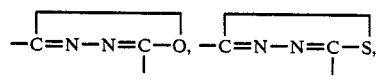

-continued

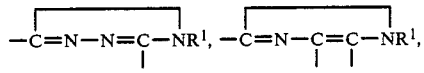

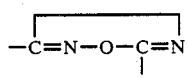

b is zero or one, c is an integer of 1–3, R' is hydrogen, lower alkyl (e.g., CH$_3$, —CH$_2$CF$_3$, —C$_6$H$_{13}$), aryl of less than 13 carbon atoms (e.g., —C$_6$H$_5$, —C$_6$H$_4$CH$_3$, C$_{10}$H$_7$) or —YZ$_c$ radical, Y is a polyvalent linking organic radical free of olefinic unsaturation such as alkylene (eg., —CH$_2$—, —C$_2$H$_4$—), oxa-alkylene (e.g., —CH$_2$OCH$_2$—), cyc)oalkylene (e.g. —C$_6$H$_{10}$—), thia-alkylene (e.g., —CH$_2$SCH$_2$—), arylene (e.g. —C$_6$H$_4$—, —C$_6$H$_4$OC$_6$H$_4$), and the like, or combinations thereof, such as aralkylene and alkarylene, Z is a polymerizable functional group such as —OH, —SH, —SR$^2$, —N(R$^2$)$_2$, —CO$_2$H, —SiR$^2_d$J$_{3-d}$, —CN,

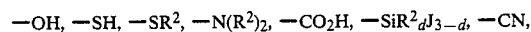

—OCOCl, —OCN, —N(R$^2$)CN, —(O)COC(O), —I,

—CHO, —CH(OCH$_3$)$_2$, —SO$_2$Cl, —C(OCH$_3$)=NH,

—C(NH$_2$)=NH, and the like, wherein R$^2$ is hydrogen, ary-1,-or lower alkyl, J is halogen, —OR$^2$, —OCOR$^2$, or —CH=CH$_2$; and d is 0 or an integer of 1 to 3. Z may also be —OCR$^3$R$^4$R$_f$ or

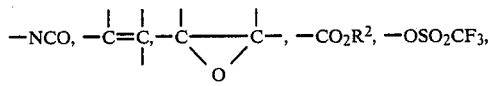

wherein R$^3$ is hydrogen, lower alkyl or lower fluoroalkyl, R$^4$ is hydrogen or lower alkyl and R$_f$ is lower fluoroalkyl. Z is preferably

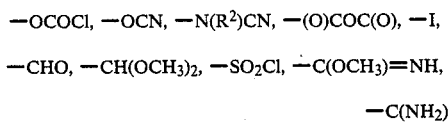

Other suitable Q groups include polymerizable isocyanate (—NCO), epoxy

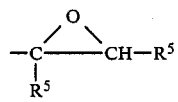

wherein each R$^5$ is independently lower alkyl) or hydrolyzable silane (e.g, SiR$^6$R$_3$-p$^7$ wherein each R$^6$ is independently a lower alkyl and p is an integer of 1 to 3) groups.

A presently preferred subclass of monofunctional comonomers is that wherein the perfluoropolyether chain is of the formula C$_3$F$_7$O(C$_3$F$_6$O)$_t$CF(CF$_3$)—    II wherein t is 4 to about 14 to provide monomers having a number average molecular weight from about 1500 to 2500. In these monomers the perfluoroalkyl chain generally contains —CF(CF$_3$)CF$_2$O— units, with optional —CF$_2$CF$_2$CF$_2$O— units. Monomers of this subclass which are currently most readily available and are most preferred are those of about 1500 to 2500 average molecular weight, i.e., those monomers wherein t is about 8 to 16.

Suitable difunctional perfluoropolyether monomers for making the copolymers of the invention include monomers represented by Formula III:

Q'(C$_a$F$_{2a}$O)$_k$C$_{a'}$F$_{2a'}$Q'    III wherein a, a' and k are as defined hereinabove for Formula I, and Q' is a polymerizable, preferably addition polymerizable, group.

Although truly difunctional monomers are preferred, monomers having average functionalities greater than one, and usually within the range of 1.5 to 2.0, will generally operate as equivalents to the difunctional monomers when mixed with monofunctional monomers to form copolymeric mixtures of this invention. It will be apparent that for most purposes mixtures prepared from primarily monofunctional and difunctional monomers will allow more simple and direct correlations of properties with functionality and for that reason they are preferred.

A class of perfluoropolyether monomers of Formula III is that which includes the difunctional ethylenically-unsaturated monomers wherein Q' of the above Formula III is selected from

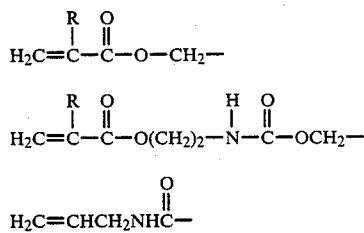

and the like wherein R is hydrogen or methyl the preparation of which monomers is disclosed in U.S. Pat. No. 3,810,874 (Mitsch et al.), U.S. Pat. No. 3,544,537 (Brace), U.S. Pat. No. 3,553,179 (Bartlett), U.S. Pat. No. 3,864,318 (Caporiccio et al.), and U.S. Pat. No. 4,321,404 (Williams et al.), which are incorporated herein by reference for that purpose.

Another class of difunctional intermediates is that which includes monomers represented by Formula IV:

wherein the ratio m/n is 0.2/1 to 5/1, and m is n+n' is 2 to 15. The preparation of these difunctional monomers is described in U.S. Pat. No. 3,250,807 (Fritz et al), which is incorporated herein by reference for that purpose.

Another class of difunctional monomers which could be useful themselves or as intermediates for preparing useful monomers is that which includes monomers represented by Formula V:

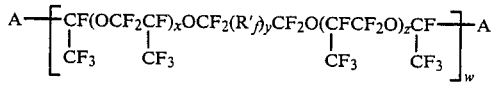

wherein each A is independently a functional, i.e., polymerizably reactive, moiety, such as COF or a derivative thereof, such as one containing a polymerizable group, w is a number greater than 1, e.g. 2 to 10, and preferably 2 to 4, x and z are independently zero or a number up to about 10, with the proviso that the sum of x + z is equal to at least 1 and can be as high as about 15, y is zero or 1, and $R'_f$ is a fluoroaliphatic group, e.g. perfluoroalkylene, which can contain one or a plurality of, e.g. 2 to 4 hetero atoms, such as catenary oxygen or nitrogen atoms, e.g. oxybis(perfluoroalkylene), said fluoroaliphatic groups having, for example, 1 to 21 carbon atoms, preferably 1 to 4 catenary carbon atoms, particularly where $R'_f$ is perfluoroalkylene. The preparation of these difunctional monomers is disclosed in U.S. Pat. No. 4,647,413 which is incorporated herein by reference for that purpose.

A further subclass of ethylenically-unsaturated perfluoropolyether monomers is that which includes monomers represented by Formula VI:

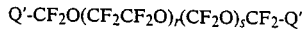

wherein Q', is as defined above and r and s designate the number of randomly distributed perfluoroethyleneoxy and perfluoromethyleneoxy backbone repeating units, respectively, r and s having independently values, for example, from 1 to 200 and the ratio r/s is 0.2/1 to 5/1.

Examples of polymerizable perfluoropolyether monomers of Formula III which would be expected to be useful for making the low-energy copolymers of the invention are those having the following formulas wherein the perfluoralkylene oxide units are randomly distributed, the given numbers of which are average values.

The polymerizable perfluoropolyethers of Formula I are similar to those set forth hereinbelow except that the functional group is present on only one terminal portion of the formula, the other terminal portion being $-C_aF_{2a+1}$ where a is an integer form 1 to 4.

Perfluoropolyether Monomer

I. $H_2C=CH-CO-CH_2CH_2NHC-CFO(CF_2CFO)_3(CF_2)_3(OCF_2CF_2)_3OCF-CNH-CH_2CH_2-OC-CH=CH_2$
   with $CF_3$ branches

II. $H_2C=CH-CO-CH_2CF_2O(CF_2CF_2O)_8(CF_2O)_{14}CF_2CH_2-OC-CH=CH_2$

III. $H_2C=C-CO-CH_2CF_2O(CF_2CF_2O)_{16}(CF_2O)_{28}CF_2CH_2-OC-C=CH_2$ with $CH_3$ groups

IV. $H_2C=CHCH_2OCH_2CF_2O(CF_2CF_2O)_{16}(CF_2O)_{28}CF_2CH_2OCH_2CH=CH_2$

V. $H_2C=C-CO(CH_2)_2NHCO-CH_2CF_2O(CF_2CF_2O)_8(CF_2O)_{14}CF_2CH_2-OCNH(CH_2)_2OC-C=CH_2$ with $CH_3$ groups VI. (aromatic urethane structure with toluene diisocyanate linkages and perfluoropolyether chain $-CF_2O(C_3F_6O)_4(CF_2O)_3CF_2-$)

VII. (IPDI-based urethane with perfluoropolyether chain $-CF_2O(CF_2CF_2O)_8(CF_2O)_{14}CF_2-$)

VIII. $H_2C=CHCO(CH_2)_2NHC-CF_2O(CF_2CF_2O)_8(CF_2O)_{14}CF_2-CNH(CH_2)_2OCCH=CH_2$

IX. $H_2C=CH-CNH-C(CH_3)_2CNH-CH_2CF_2O(CF_2CF_2O)_8(CF_2O)_{14}CF_2-NHC-C(CH_3)_2NHC-CH=CH_2$

X. $H_2C=CHCH_2NHC-CF_2O(CF_2CF_2O)_8(CF_2O)_{14}CF_2CNH-CH_2CH=CH_2$

-continued
Perfluoropolyether Monomer
XI 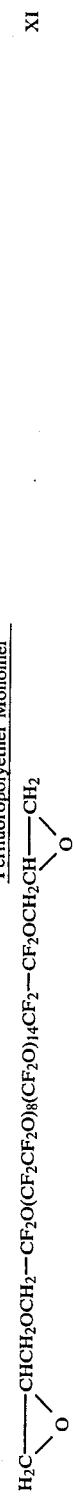
$H_2C$—CHCH$_2$OCH$_2$—CF$_2$O(CF$_2$CF$_2$O)$_8$(CF$_2$O)$_{14}$CF$_2$—CF$_2$OCH$_2$CH—CH$_2$
XII 
XIII 
XIV 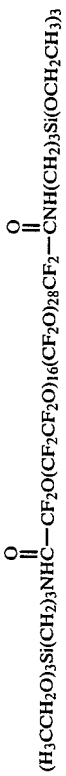
$(H_3CCH_2O)_3Si(CH_2)_3NHC$—CF$_2$O(CF$_2$CF$_2$O)$_{16}$(CF$_2$O)$_{28}$CF$_2$—CNH(CH$_2$)$_3$Si(OCH$_2$CH$_3$)$_3$
XV 
XVI 

The copolymers of the invention are prepared from mixtures of monomers of Formula I and Formula III. These copolymers provide surprisingly good release properties at lower cost than polymers prepared from monomers of formula III. It has been found that copolyermic mixtures having from 25 to 50 weight percent of monomers of Formula I provide the best release properties in certain presently preferred mixtures.

It is known that small amounts of impurities can be found in the mono- and difunctional monomers used to make the polymers of the invention. These impurities are primarily nonfunctional, i.e., non-polymerizable, materials or monomers with functionality different than that primarily planned. It is preferred that the nonfunctional impurities be kept at a level less than 10%, and more preferably as low as practical, to allow good quality control. Monofunctional monomers can be purchased with less than 1% nonfunctional impurities. Difunctional monomers with about 5% nonfunctional impurities are available.

When the perfluoropolyether monomers have polymerizable functional groups having ethylenic unsaturation such as acryloyl, acrylamide, and vinyl ether, polymerization can be effected by exposing the coated substrate to ultraviolet radiation, preferably in an inert atmosphere. Generally, the use of photoinitiators to enhance the rate of polymerization is not necessary when the perfluoropolyether monomer coating layer is thin, e.g., less than about 100 nm on a substrate such as polyester film or other photoactive substrate. The rate of polymerization of thicker coatings can be enhanced by adding about 0.01 to 5 percent, preferably about 0.25 to 1 percent by weight photoinitiator, such as benzoin ethers, to the monomer mixture. When the perfluoropolyether monomer has hydrolyzable silane, epoxy, or isocyanate polymerizable groups, thermal polymerization can be employed by exposing the coated substrate to thermal radiation. When the polymerizable groups are epoxy, ultraviolet radiation may be employed in air in the presence of an aromatic onium salt polymerization catalyst, such as diphenyliodonium hexafluoroantimonate or triphenylsulfonium hexafluoroantimonate, incorporated into the coating solution.

In any event, the polymer making up the layer tends to be insoluble, i.e., crosslinked, as manifested by its insolubility in Freon TM 113 (1,1,2-trichloro-2,2,1-trifluoroethane) at 20° C.

The thickness of the low energy layer of copolymer is conveniently controlled by the proportion of solvent in the solution from which the perfluoropolyether monomer is coated. Coating techniques useful for in-line processing include brushing, wire or knife coating, spraying, curtain coating and gravure coating. While the thickness of the low energy layer is preferably less than 500 nm because of the high cost of perfluoropolyether monomer, much greater thicknesses are useful. The coating can be as thin as 5 or 10 nm. The particular thickness used will also depend on the particular application or utility of the liner.

The perfluoropolyether segments in the polymer form a cohesive network which apparently becomes bonded to the contiguous substrate at a large number of points, and even though the bonds may be individually quite weak, together they adequately adhere the network to the substrate.

Suitable substrates to which the coating can be applied, include, for example, paper, glass, steel, aluminum, polymers such as polyethylene, polyester, polyvinyl chloride, polypropylene, non-woven fabrics and the like. The present invention provides a low surface energy liner which is effective as a low-adhesion coating for use with the most aggressive pressure-sensitive ness of adhesives without unduly diminishing the adhesive said adhesives. For those applications in which the release coated article is to be a pressure-sensitive tape or sheet, it is desirable that the substrate be flexible. A preferred substrate is polyester film. The low surface energy liners of the invention are also useful in a variety of other applications such as nonstick coatings for cooking utensils, ice-releasing coatings for aircraft, and lubricative coatings for magnetic recording media. If the low surface energy liner does not adhere well to the substrate, it may be desirable to first apply a primer or an adhesion-promoting coating, as is well-known in the art.

In making a low surface energy layer of the invention, one or more other types of monomers copolymerizable with the perfluoropolyether monomer may be dissolved into the solution. The layer is most effective if the amount of the perfluoropolyether monomer is such that at least 75 weight percent is provided by perfluoropolyether segments. When the perfluoropolyether monomer has polymerizable groups which are ethylenically unsaturated, useful copolymerizable monomers include acrylic and methacrylic esters, amides, urethanes, and vinyl ethers.

When Q of Formula I or Q' of Formula III is a 1,2-epoxy group, useful copolymerizable monomers include 1,2-epoxy-substituted esters, ethers, siloxanes, and nitriles such as listed in columns 3 and 4 of U.S. Pat. No. 4,219,377.

When Q of Formula I or Q' of Formula III is a hydrolyzable silane group, useful copolymerizable monomers include silanes which may be linear or cyclic and may have alkoxy, halo, cyano, aceto, methacryloxy, lower alkenyl, or phenyl substituents.

When Q of Formula I or Q' of Formula III is an isocyanato group, useful copolymerizable monomers include isocyanates, polyols, and polyamines.

The present invention includes articles containing coatings and liners of the copolymers of the invention. Optionally these articles include a substrate having a composite liner provided by an inner layer of insoluble polymer made from polymerizable film-forming monomer having a polymerizable functionality greater than 1 such as is disclosed in U.S. Pat. No. 4,567,073 (Larson et al.) which is incorporated herein by reference for that purpose, and an outer layer of insoluble copolymer of the present invention made from a polymerizable film-forming monomer copolymerizable with the monomer of said inner layer and having perfluoropolyether segments. Preferably the monomers are addition polymerizable and the monomers are in-situ polymerized. Apparently the contiguous monomers of the two layers copolymerize, thus bonding the perfluoro- polyether segments to the substrate through the inner layer.

By polymerizing both layers in their contiguous relationship, the perfluoropolyether segments have significantly greater adherence to the substrate than they would have had if the perfluoropolyether monomers had been applied directly to the substrate and then polymerized in situ. By virtue of that greater adhesion, the low surface energy liner not only better resists transfer when used as a low-adhesion coating for a pressure-sensitive adhesive, but becomes highly resistant to removal when subjected to abrasion or wear. Even though the total thickness of the composite may be ultra-thin, i.e., 10 to 100 nm, the adhered perfluoropolyether provides a barrier or liner which prevents the most aggressive pressure-sensitive adhesives from becoming appreciably bonded to the underlying substrate, and continues to provide effective lubrication even after prolonged storage.

The composite low surface energy layer of liner of the invention may be applied to a substrate by the steps of (a) coating onto the substrate a first dilute solution of said nner layer monomer to provide an inner coating of monomer, (b) coating over the coating of step (a) a second dilute solution of said perfluoropolyether monomers thus providing an outer coating, (c) drying the twice coated substrate, and (d) polymerizing said monomers, thus bonding the perfluoropolyether segments to the substrate through the inner layer.

The polymerization is carried out as previously described.

The thickness of the low energy layer is conveniently controlled by the proportion of solvent in the two dilute solutions. Coating techniques described hereinabove are useful. Curtain coating permits essentially simultaneous application of both solutions. If the coating technique used for applying the second solution involves mechanical contact of the inner layer coating, e.g., gravure coating, the inner layer coating preferably is first dried or partially polymerized to develop some abrasion resistance before applying the second solution, and the solvent of the second solution should not be a solvent for the material deposited from the first solution.

The thickness of the inner layer may range from about 10 nm to about 0.2 mm. Toward the higher end of that range, the composite low surface energy liner may have better resistance to abrasion, but for some uses it is preferred that the low surface energy liners be as thin as possible, e.g., when used as protective lubricating coatings for magnetic recording media, it being desirable to minimize the spacing between the heads and the magnetizable material of the recording media. Generally the outer layer should be thin, e.g., less than 500 nm, preferably less than 100 nm, because the polyfluoropolyether monomer is expensive, and it may be as thin as 5 or 10 nm. On the other hand, the outer layer can be thicker than 500 nm for some uses.

Suitable monomers for use in making the inner layer of the composite, low surface energy liners of the invention are one or more of any film-forming polymerizable monomers containing at least two polymerizable groups, preferably groups having ethylenic unsaturation, at least one of which is copolymerizable with that of the monomers used to make the outer layer. Examples of such inner layer monomers are the acrylate and methacrylate esters of alkanepolyols such as 1,6-hexamethylene diacrylate, pentaerythritol triacrylate, pentaerythritol tetraacrylate, trimethylolpropane triacrylate and dipentaerythritol pentaacrylate; 1,3,5-tris(2-methacryloyloxyethyl)-s- triazine; polyeste-r-polyol acrylates and methacrylates such as

other polyester acrylates and methacrylates whose preparation is disclosed in U.S. Pat. No. 4,050,936 (Takedo et al.) which is incorporated herein by reference for that purpose, the heterocyclic polyol acrylates and methacrylates such as

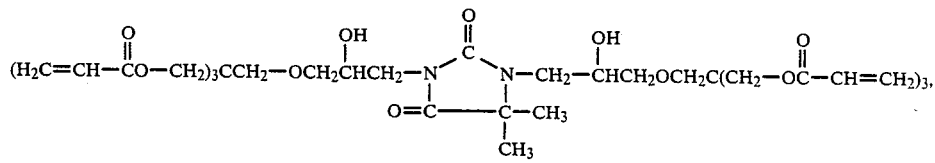

1,3-bis[3-(2-acryloyloxyethoxy)-2-hydroxypropyl]-5,5-dimethyl-2,4-imidazolidinedione, whose preparation is described in U.S. Pat. No. 4,306,954 (Wendling et al.) which is incorporated herein by reference for that purpose, glycidyl methacrylate, isocyanatoethyl methacrylate, and 3-methacryloxypropyltrimethoxysilane; tris(2-methoxyethoxy)vinylsilane; 3,4-epoxycyclohexylmethyl-3,4-epoxycyclohexanecarboxylate; and diallyl phthalate.

The following specific, but non-limiting examples will serve to illustrate the invention. In these examples, all parts and percentage are by weight unless otherwise indicated. In these examples, the following tests are used.

Release Peel Test, Type A: A poly(dimethylsiloxane) [DC 355 from Dow Corning, available as a 18.5% solution in "Freon" 113] is coated onto the film having the monomer treated surface using a knife coater and allowed to dry for 2 hours to provide an aggressive pressure-sensitive adhesive layer having a thickness of 0.038 mm. To the adhesive surface is laminated 0.038 mm poly(ethylene terephthalate) film. After aging the sample at 70° C. (dry heat) for 24 hours, the sample is allowed to cool to 22° C. The release peel force required to remove the silicone pressure-sensitive adhesive from the monomer treated film is measured by peeling off the poly(ethylene terephthalate) film at an angle of 180° and at a peel rate of 2.3 m/min.

Release Peel Test, Type B: A pressure-sensitive adhesive tape having a 0.025 mm thick poly(dimethylsiloxane) pressure-sensitive adhesive (Dow Corning DC 284) layer on a 0.038 mm thick biaxially-oriented poly(ethylene terephthalate) film having no backsize coating is pressed against the film having the monomer treated surface using a smooth plastic bar. The sample is aged for 15 days at 70° C. and the release peel force is measured by peeling off the poly(ethylene terephthalate) film at an angle at 180° and at a rate of 2.3 m/min.

Readhesion Peel Test: The pressure-sensitive adhesive tape removed in the Release Peel Test is applied to a clean glass plate and the peel force for its removal measured at a peel rate of 2.3 m/min. and at a peel angle of 180°.

EXAMPLES 1-8 AND COMPARATIVE EXAMPLES 1-4

Coating solutions containing a monofunctional perfluoropolyether monomer, $CF_3(C_3F_6O)_{3.4}CF_2CH_2OCOCH=CH_2$, designated MFM, and/or a difunctional perfluoropolyether monomer, $CH_2=CHCOOCH_2CF_2O(C_2F_4O)_8(CF_2O)_{14}CF_2CH_2OCOCH=CH_2$, designated DFM1, in the ratios set forth in Table 1, as 0.50 weight percent monomer in 1,1,2-trichloro-2,2,1-trifluoroethane, were coated onto a 2.9 mil (0.074 mm) poly(ethylene terephthalate) film using a No. 3 wire wound rod. The solvent was evaporated to provide a calculated dry thickness of 35 nm in Examples 1-4 and Comparative Examples 1-2 and a calculated dry thickness of 70 nm in Examples 5-8 and Comparative Examples 3-4. This coated film was then passed once at 1830 cm/min through an ultraviolet processor Model QC 1202AN31R, available from PPG Industries, irradiating with two medium pressure mercury lamps at 80 watts per centimeter in a nitrogen atmosphere to form a liner on the polyethylene terephthalate film.

The release peel force and readhesion peel force were determined using Release Peel Test, Type B, and the Readhesion Peel Test. The results are set forth in Tables 1 and 2. The readhesion peel force for the poly(dimethylsiloxane) pressure-sensitive adhesive tape which had not previously been subjected to the Release Peel Test was about 2600 g/cm.

TABLE 1

(Coating Thickness: 35 nm)

| Example | MFM/DFM1 ratio | Release Peel Force (g/cm) | Readhesion Peel Force (g/cm) |
|---|---|---|---|
| Comp 1 | 0/100 | 135 | 2130 |
| 1 | 25/75 | 46 | 1570 |
| 2 | 50/50 | 36 | 1850 |
| 3 | 75/25 | 46 | 2350 |
| 4 | 90/10 | 56 | 2490 |
| Comp 2 | 100/0 | 860 | 2200 |

TABLE 2

(Coating Thickness: 70 nm)

| Example | MFM/DFM1 ratio | Release Peel Force (g/cm) | Readhesion Peel Force (g/cm) |
|---|---|---|---|
| Comp 3 | 0/100 | 30 | 1350 |
| 5 | 25/75 | 25 | 1570 |
| 6 | 50/50 | 23 | 1780 |
| 7 | 75/25 | 33 | 2420 |
| 8 | 90/10 | 41 | 2130 |
| Comp 4 | 100/0 | 145 | 2200 |

As can be seen from the data in Table 1, the monomer mixture containing both the monofunctional and difunctional perfluoropolyether monomers provided liners which exhibited significantly improved release peel force with good readhesion peel force at a thickness of 35 nm when compared to liners prepared from either the monofunctional or difunctional perfluoropolyether monomer alone. As can be seen from the data in Table 2, the liners of Examples 5-8 exhibited good readhesion peel force and release peel force significantly better than Comparative Example 4 prepared from only the monofunctional perfluoropolyether monomer and substantially similar to or better than Comparative Example 3 prepared from only the more expensive difunctional perfluoropolyether.

EXAMPLES 9-11 AND COMPARATIVE EXAMPLES 5 and 6

Coating solutions containing the monofunctional perfluoropolyether monomer, $CF_3(C_3F_6O)_{3.4}CF_2CH_2OCOCH=CH_2$, used in Examples 1-8 and designated MFM, and/or a difunctional perfluoropolyether monomer,

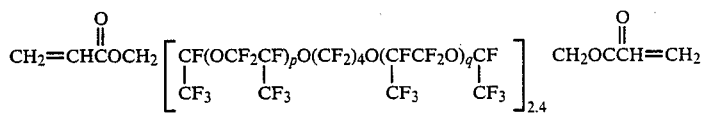

designated DFM2 wherein $p+q$ is 2.5 and the number average molecular weight is 2200, at the ratios set forth in Table 3, as 50 weight percent monomer in 1,1,2-trichloro-2,2,1-trifluoroethane were coated onto a 2.9 mil (0.034 mm) polyethylene terephthalate film using a No. 3 wire wound rod. The solvent was evaporated to provide a calculated dry thickness of 35 nm. The coated films were then passed once at 1830 cm/min through an ultraviolet processor Model QC 1202AN31R, available from PPG Industries, irradiating with two medium pressure mercury lamps at 80 watts per centimeter while under a nitrogen atmosphere to form liners on the film.

The release peel force and readhesion peel force were determined using Release Peel Test, Type A, and the Readhesion Peel Test.

The readhesio peel force for the poly(dimethylsiloxane) pressure-sensitive adhesive tape which had not previously been subjected to the Release Peel Test was about 4800 g/cm.

TABLE 3

| Example | MFM/DFM2 ratio | Release Peel Force (g/cm) | Readhesion Peel Force (g/cm) |
|---|---|---|---|
| Comp 5 | 0/100 | 4760 | 2490 |
| Comp 6 | 10/90 | 3490 | 1780 |
| Comp 7 | 25/75 | 1780 | 2630 |
| 9 | 50/50 | 500 | 4200 |
| 10 | 75/25 | 240 | 3910 |
| Comp 8 | 100/0 | 1560 | 3060 |

As can be seen from the data in Table 3, the liners of Examples 9 and 10 exhibit significantly improved release peel force and readhesion peel force over the liners of Comparative Examples 5-8.

The various modifications and alterations of this invention will be apparent to those skilled in the art without departing from the scope and spirit of this invention and this invention should not be restricted to that set forth herein for illustrative purposes.

What is claimed is:

1. An article comprising a substrate having a release coating thereon, said coating comprising a copolymer prepared from a mixture of (a) at least 10 weight percent of at least one monofunctional perfluoropolyether monomer having a number average molecular weight of about 1500 to 2500, which monomer comprises $C_3F_7O(C_3F_6O)_tCF(CF_3)Q$ or $CF_3O(C_3F_6O)_tCF_2Q$ wherein t is 4 to 16 and Q is a terminal polymerizable group and (b) at least one difunctional perfluoropolyether monomer having a number average molecular weight of about 1500 to 2500, which monomer comprises

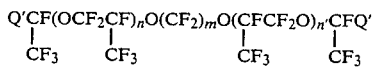

wherein t is 4 to 16, m is 3 to 15, n+n' is 2 to 15, the ration of m/(n+n') is 0.2./1 to 5/1, and Q' is a terminal polymerizable group,
said monofunctional perfluoropolyether monomer and said difunctional perfluropolyether monomer being present in amouns such that the coating provides a release peel value less than that provided by a polymer coating of the monofunctional perfluoropolyether monomer and substantially similar to or less than that of a polymer coating of the difunctional perfluoropolyether monomer at the same thickness.

2. The article of claim 1 wherein said coating is less than about 50 nm thick.

3. The article of lcaim 1 wherein Q and Q' are —CH$_2$OCOCH=CH$_2$.

4. The article of claim 1 wherein said monofunctional perfluoropolyether is $CF_3O(C_3F_6O)_{3.4}CF_2CH_2OCOCH=CH_2$ and said difun perfluoropolyether is

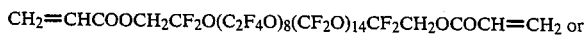
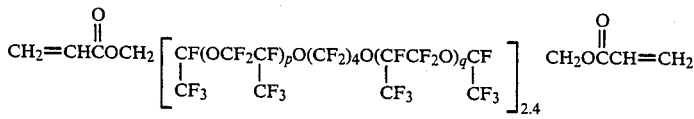

wherein p+q is 2.5 and the number average molecular weight is 2200.

5. The article of claim 1 wherein said monofunctional perfluropolyether monomer comprises about 10 to 75 weight percent of said mixture.

6. The article of claim 1 wherein said substrate is a film.

7. A pressure-senstive adhesive tape comprising a flexible web having a pressure-senstive adhesive layer adherently bonded to at least one sid thereof, and a liner comprising a cured copolymer prepared fr©m a mixture of at least 10 weight percent of at least one monofunctional perfluoropolyether monomer having a number average molecular weight in the range of 500 to 2500 which comprises $C_3F_7O(C_3F_6O)_tCF(CF_3)Q$ or $CF_3O(C_3F_6O)_tCF_2Q$ wherein t is 4 to 16 and Q is a terminal polymerizable group, and at least one difunctional perfluoropolyether monomer having a number average molecular weight in the range of 1500 to 2500 which comprises

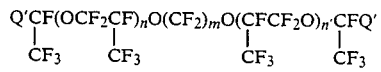

wherein t is 4 to 16, m is 3 to 15, n+n' is 2 to 15, the ratio of m/n+n') is 0.2/1 to 5/1, and Q' is a terminal polymerizable group, the monofunctional perfluropolyether monomer and the difunctional perfluoropolyether monomer being present in amounts such that the liner provides a release peel value less than that provided by a polymer coating of the monofunctional perfluropolyether monomer and substantially similar to or less than that of a polymer coating of the difunctional perfluoropolyether monomer at the same thickness.

8. The pressure-sensitive adhesive tape of claim 7 wherein Q and Q' are —CH$_2$OCOCH=CH$_2$.

9. The pressure-sensitive adhesive tape of claim 7 wherein said monofunction perfluropolyether is $CF_3O(C_3F_6O)_{3.4}CF_2CH_2OCOCH=CH_2$ and said difunctional perfluoropolyether is

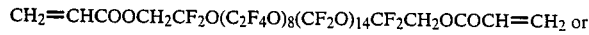
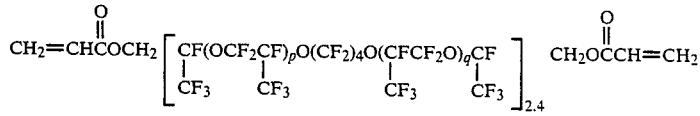

wherein p+q is 2.5 and the number average molecular weight is 2200.

10. The pressure-sensitive adhesive tape of claim 7 wherein said adhesive layer comprises poly(dimethylsiloxane).

11. The pressure-sensitive adhesive tape of claim 7 wherein said monofunctional perfluoropolyether monomer comprises about 10 to 75 weight percent and said ifunctional perfluropolyether monomer comprises about 25 to 90 weight percent of said mixture.

12. The pressure-sensitive adhesive tape of claim 7 wherein said liner is less than about 50 nm thick.

13. The pressure-senstive adhesive tape of claim 7 wherein said flexible web is a film.

14. a method of making a substrate with a liner comprising the steps of (a) proiding a dilute solution of polymerizable monomers comprising a mixture of at least one monofunctional perfluropolyether monomer having a molecular weight in the range of about 1500 to 2500, which comprises $C_3F_7O(C_3F_6O)_tCF(CF_3)Q$ or $CF_3O(C_3F_6O)_tCF_2Q$ wherein t is 4 to 16 and Q is a terminal polymerizable group, and at least one difunctional perfluoropolyether monomer having a molecular weight in the range of about 1500 to 2500, which comprises

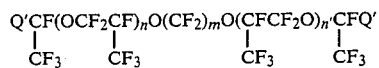

wherein t is 4 to 16, m is 3 to 15, n+n' is 2 to 15, the ratio of m/(n+n') is 0.2/1 to 5/1, and Q' is a terminal polymerizable group,
(b) coating said solution onto the substrate,
(c) drying the coating, and
(d) in-situ polymerizing the monomer to provide an insoluble, cohesive polymer liner which linear is adhered to the substrate, the monofunctional perfluoropolyether monomer and the difunctional perflruoropolyether monomer being present in amounts such that the linear provides a release peel value less than that provided by a polymer coating of the monofunctional perfluropolyether monomer and substantially similar to or less than that of a polymer coating of the difunctional perfluropolyether monomer at hte same thickness.

15. The method of claim 14 wherein the polymerizable groups are ethylenic unsaturated, and the polymerizing step (d) involves exposing the dried coating to ultraviolet radiation.

16. The method of claim 14 wherein said monofunctional perfluoropolyether monomer comprises about 10 to 75 weight percent and said difunctional perfluoropolyether monomer comprises about 25 to 90 weight percent of said mixture.

17. The method of claim 14 wherein said polymer linear is less than about 50 nm thick.

* * * * *

UNITED STATES PATENT AND TRADEMARK OFFICE
CERTIFICATE OF CORRECTION

PATENT NO. : 4,830,910

DATED : May 16, 1989

INVENTOR(S) : JAMES M. LARSON

It is certified that error appears in the above-identified patent and that said Letters Patent is hereby corrected as shown below:

Col. 4, line 58-59, after "a" delete the space and "10 weight".

Col. 4, line 60, after "least" insert --10 weight--.

Col. 4, line 65, after "independently" insert --an--.

Col. 5, line 19, after "method" insert --of--.

Col. 5, line 52, "we.ight" should be --weight--.

Col. 7, line 18, "Cyc)oalkylene" should be --cycloakylene--.

Col. 7, line 36, "ary-1,-or" should be --aryl, or--.

Col. 7, line 61, a dash "-" should be added.

Col. 7, line 66, "$R_{3-p}^{7}$" should be -- $R^{7}_{3-p}$ --.

Col. 8, line 30, after "form" insert --the--.

Col. 8, line 67, after "m is" insert --3 to 45 and--.

Col. 10, line 27, should read -- $C_{a'}F_{2a'+1}$ --.

UNITED STATES PATENT AND TRADEMARK OFFICE
CERTIFICATE OF CORRECTION

PATENT NO. : 4,830,910

DATED : May 16, 1989

INVENTOR(S) : JAMES M. LARSON

It is certified that error appears in the above-identified patent and that said Letters Patent is hereby corrected as shown below:

Col. 15, line 5, "formula" should be --Formula--.

Col. 16, line 5, delete "ness of".

Col. 16, line 6, "adhesive" should be --adhesiveness of--.

Col. 17, line 17, "nner" should be --inner--.

Col. 18, line 7, "methacryloyloxyethyl)-s- triazine" should be --methacryloyloxyethyl)-s-triazine--.

Col. 18, line 7, "polyest-r-polyol" should be --polyester polyol--.

Col. 19, line 32, "foroe" should be --force--.

Col. 20, line 41, "readhesio" should be --readhesion--.

Col. 21, line 16, delete the comma before "the".

Col. 21, line 21, "amouns" should be --amounts--.

Col. 21, line 37, "lcaim" should be --claim--.

Col. 21, line 41, "difun" should be --difunctional--.

UNITED STATES PATENT AND TRADEMARK OFFICE
CERTIFICATE OF CORRECTION

PATENT NO. : 4,830,910

DATED : May 16, 1989

INVENTOR(S) : JAMES M. LARSON

It is certified that error appears in the above-identified patent and that said Letters Patent is hereby corrected as shown below:

Col. 21, line 55, after "weight percent" insert --and said difunctional perfluoropolyether monomer comprises about 25 to 90 weight percent--.

Col. 21, line 60, "sid" should be --side--.

Col. 21, line 61, "fr©m" should be --from--.

Col. 22, line 21, "monofunction" should be --monofunctional--.

Col. 22, line 40, "ifunctional" should be --difunctional--.

Col. 23, line 12, "linear" should be --liner--.

Col. 23, line 16, "linear" should be --liner--.

Col. 24, line 4, "hte" should be --the--.

Signed and Sealed this

Twenty-fourth Day of April, 1990

Attest:

HARRY F. MANBECK, JR.

*Attesting Officer*  *Commissioner of Patents and Trademarks*

UNITED STATES PATENT AND TRADEMARK OFFICE
CERTIFICATE OF CORRECTION

| | | |
|---|---|---|
| PATENT NO. : | 4,830,910 | Page 1 of 2 |
| DATED : | May 16, 1989 | |
| INVENTOR(S) : | James M. Larson | |

It is certified that error appears in the above-identified patent and that said Letters Patent is hereby corrected as shown below:

Cols. 13-14, line 2 should be:

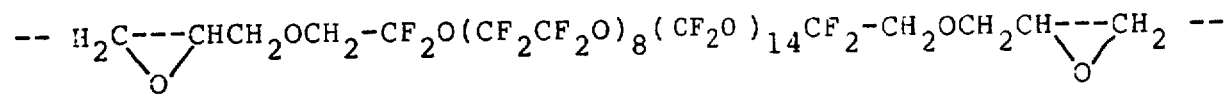

UNITED STATES PATENT AND TRADEMARK OFFICE
CERTIFICATE OF CORRECTION

PATENT NO. : 4,830,910
DATED : May 16, 1989
INVENTOR(S) : James M. Larson

It is certified that error appears in the above-identified patent and that said Letters Patent is hereby corrected as shown below:

Cols. 13-14, line 15:

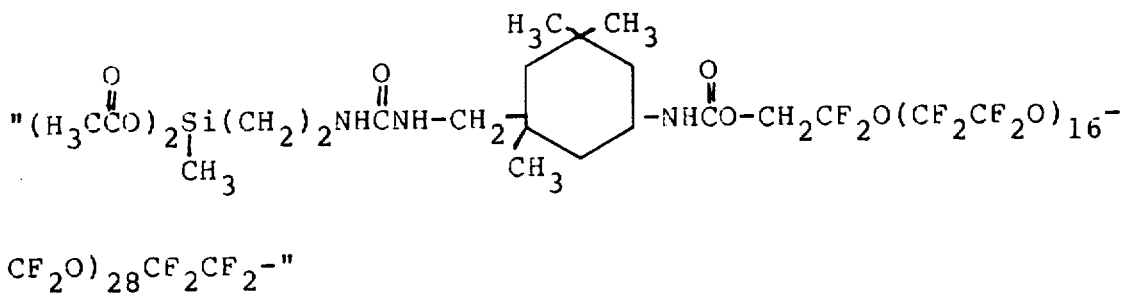

should be:

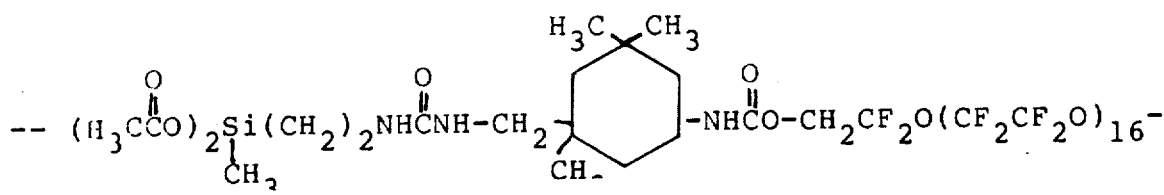

Signed and Sealed this

Second Day of April, 1991

Attest:

HARRY F. MANBECK, JR.

Attesting Officer

Commissioner of Patents and Trademarks

UNITED STATES PATENT AND TRADEMARK OFFICE
CERTIFICATE OF CORRECTION

PATENT NO. : 4,830,910　　　　　　　　　　　　　　　Page 1 of 2
DATED : May 16, 1989
INVENTOR(S) : James M. Larson It is certified that error appears in the above-identified patent and that said Letters Patent is hereby corrected as shown below:　This Certificate of Correction Supersedes
Cols. 13-14, line 2　Certificate of Correction Issued April 2, 1991.

XI should be:

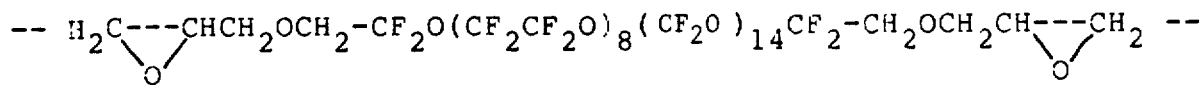

UNITED STATES PATENT AND TRADEMARK OFFICE
CERTIFICATE OF CORRECTION

PATENT NO. : 4,830,910  
DATED : May 16, 1989  
INVENTOR(S) : James M. Larson

Page 2 of 2

It is certified that error appears in the above-identified patent and that said Letters Patent is hereby corrected as shown below:

Cols. 13-14, line 15:

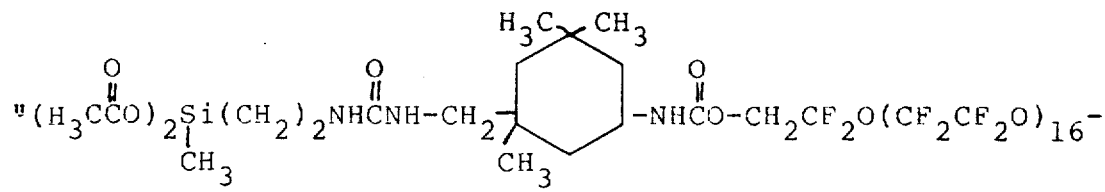

$CF_2O)_{28}CF_2CF_2-$ "

should be:

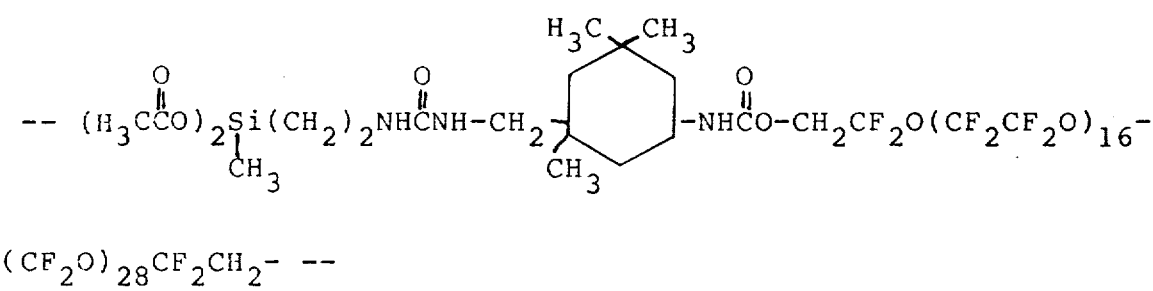

$(CF_2O)_{28}CF_2CH_2-$ --

Signed and Sealed this

Tenth Day of November, 1992

Attest:

DOUGLAS B. COMER

Attesting Officer

Acting Commissioner of Patents and Trademarks